Dec. 20, 1955     L. M. SOUSA ET AL     2,727,532
PRESSURE REGULATING VALVES
Filed June 30, 1952
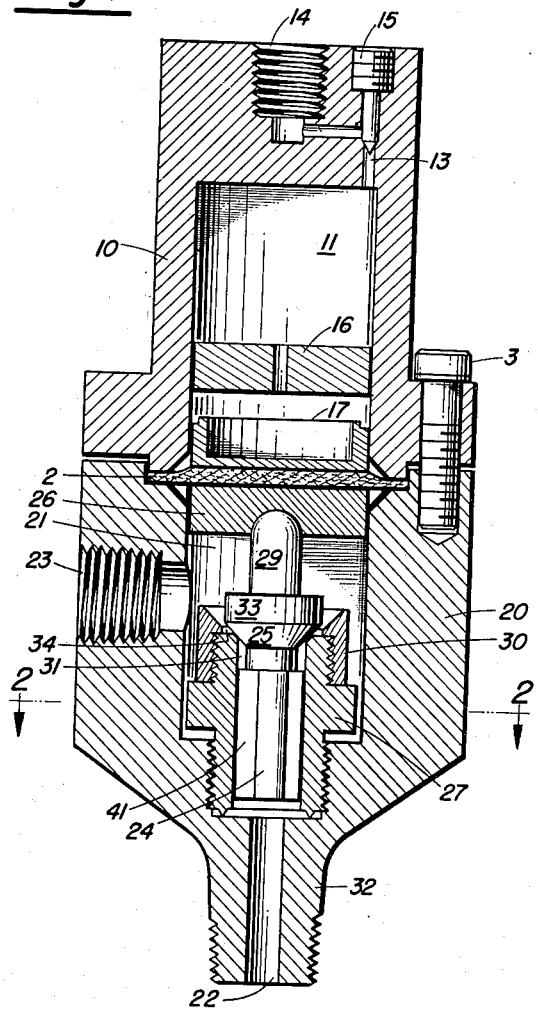
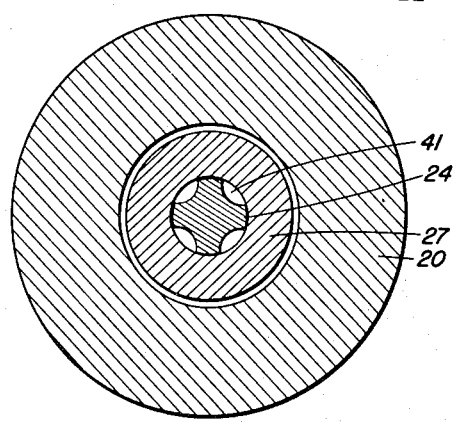
INVENTOR.
Louis M. Sousa
Charles Merlin
BY
Paul M. Klein Jr.
Attorney

United States Patent Office 2,727,532
Patented Dec. 20, 1955

2,727,532

PRESSURE REGULATING VALVES

Louis M. Sousa and Charles Merlin, San Francisco, Calif.

Application June 30, 1952, Serial No. 296,525

4 Claims. (Cl. 137—528)

(Granted under Title 35, U. S. Code (1952), sec. 266)

The invention described herein may be manufactured and used by and for the Government of the United States of America for government purposes without the payment of any royalties thereon or therefor. This invention relates to a pressure regulating valve and, more particularly, to a fluid-loaded valve.

Prior art pressure regulating valves commonly use spring loading, either by means of a coil spring or a resilient metal diaphragm, and were frequently unsatisfactory because, with use the spring mechanism was easily distorted and calibration for precise control was difficult. An object of the present invention is to provide a valve, free of springs, which is capable of automatically opening to pass gases and other fluids when the pressure in the fluid line or chamber to which the valve is connected, exceeds a certain predetermined limit, and which will automatically close to become fluid-tight when pressure in the fluid line or chamber is equal to or drops below this limit.

Other objects and many of the attendant objects of this invention will be readily appreciated as the same becomes better understood by reference to the following detailed description when considered in connection with the accompanying drawings wherein:

Fig. 1 is a longitudinal view, partly in section and partly in elevation of a valve embodying the principle of the invention; and Fig. 2 is a sectional view taken along the line 2—2 of Fig. 1.

The valve comprises a substantially cylindrical body which is formed sectionally of an upper section 10 and a lower section 20, these two sections having aligned cylindrically bored chambers 11 and 21, respectively. One of the cylindrical chambers, in this case illustrated as a chamber 21, is counter-bored at its abutting surface with the other section, thus providing an annular seat for a fluid-tight diaphragm 2, which is positioned between the chambers 11 and 21 for sealing the one from the other. Diaphragm 2 is clamped in place between the sections 10 and 20 by means of screws 3, and is preferably formed of an oil-resisting rubber substitute such as chloroprene or neoprene.

From the upper end of chamber 11 an inlet passage 13 communicates with an internally threaded opening 14, which is adapted to receive a fitting (not shown) connected to a source of fluid under pressure. A needle valve 15 serves as a means for regulating fluid flow through the passage 13.

An apertured disc 16 is fixed transversely across a medial portion of chamber 11, and between disc 16 and diaphragm 2 is located a displaceable piston 17, having a cylindrical bore formed on the side of it adjacent to disc 16 and having a flat surface on the opposite side of it adjacent to diaphragm 2.

The lower end of section 20 includes a fitting 32, which is externally threaded for connection to a fluid line or chamber (not shown). Passing through the fitting portion 32 is an inlet passage 22 leading from the fluid line or chamber to chamber 21. Located near the upper end of section 20 is an outlet passage 23 connected to the chamber 21 and internally threaded to receive a fitting (not shown).

Chamber 21 serves as a housing for a longitudinally displaceable valve member having a fluted stem 24, a disc 25, and a piston portion 26. The flutes 41 in the stem 24 (Fig. 2) serve to conduct fluid from the inlet passage 22 to the seating side of the disc 25. Disc 25 flares outwardly from its base and terminates in a cylindrical portion 33. The valve member also has a short stem section 29 formed integral therewith and extending into the piston portion 26. The stem section 29 is not rigidly connected to the piston portion 26 but simply bears against it with the spherical end of section 29 being received in a corresponding spherical recess in the piston portion 26.

Stem 24 is slidably mounted in bushing 27, the bushing being threadedly engaged at its lower end with valve section 20 and upper end with blow-back ring 30. Ring 30 is downwardly and inwardly tapered to form, in cooperation with disc 25, a slow leakage path 34.

*Operation*

In operation, a fluid such as air is introduced into chamber 11 by means of passage 13, the quantity of fluid introduced being determined by the maximum pressure desired in the fluid line or chamber with which the valve is to be used. The introduced fluid forces piston 17 against diaphragm 2, which then engages piston 26 and pushes the disc 25 into a closed position against the seat 27. By means of the disc 32 the valve is connected to a fluid line or chamber whose pressure is to be regulated. The pressure of the fluid in the line or chamber to be regulated is transmitted to the lower chamber 21 by way of inlet passage 22, travels through the flutes 41 in stem 24 and thence to an annular pocket 31 at the base of disc 25. As long as the diaphragm pressure in chamber 11 is equal to or greater than the diaphragm pressure in chamber 21, disc 25 does not move from its seat on bushing 27. The valve is thus closed and no fluid can pass from the line or chamber to be controlled. However, when the fluid line pressure exceeds a certain predetermined value, disc 25 is pushed upward, leaving its seat on bushing 27 and allowing passage of fluid into the upper portion of chamber 21 and hence out of the passage 23. Passage of fluid in this manner continues as long as the fluid-carrying line pressure remains above said predetermined value. When pressure in the fluid line falls below this value, the valve closes under the action of the pressure in chamber 11 acting on diaphragm 2 and flow of fluid through the valve automatically ceases. Slow leakage path 34 provides a cushioning effect in the closing of the valve, and the faired countersunk portions of the cylindrical body sections 10 and 20 provide a like cushioning effect in the flexing of the rubber diaphragm 2, also avoiding any tendency to shear the diaphragm. Also, the air, which has been forced through the aperture in disc 16 by motion of piston 17 toward the disc, now similarly returns through the aperture. A spring-like cushioning effect is thus exhibited by the volume of air between disc 16 and piston 17 whenever piston 17 is moved up or down.

This valve is particularly useful as a relief valve for blowing off to the atmosphere in case of excess pressure, but can also be used when connected between two chambers whose differential pressure it is desired to control. It can be seen that the valve of the present invention is quite compact inasmuch as the lower piston portion 26 is used as a guide, thus serving to maintain the valve body quite short in overall length avoiding any long leverage that frequently causes valves to hang up. The inclusion of a rubber diaphragm in place of a metal diaphragm insures that there will be no permanent deformation of the diaphragm and provides a material that will stand up under greater pressure for longer times. The use of the piston 17 serves to distribute the pressure in the chamber 11 essentially over the surface of the diaphragm. The overall design provides conveniently that the diaphram be imperforate, thus avoiding possible sources of leakage, common in prior art metal diaphragms.

Obviously many modifications and variations of the present invention are possible in the light of the above teachings. It is therefore to be understood that within the scope of the appended claims the invention may be practiced otherwise than as specifically described.

What is claimed is:

1. In a device for regulating fluid pressure, a body having a chamber with fluid inlet and outlet openings; a valve member disposed within said chamber and movable in opposite directions to control flow of fluid through said body, said valve member being urged towards open position by the difference in pressure between said openings; means for urging said valve member towards closed position comprising a fluid-loaded, sealed chamber; a diaphragm forming a common wall between said second mentioned chamber and said first mentioned chamber, a piston in said second mentioned chamber slidably movable in contact with the interior surface thereof and resting against said diaphragm and spanning substantially the entire free surface of one side of said diaphragm; a piston on said valve member slidably movable in contact with the interior surface of said first mentioned chamber and bearing against and substantially spanning the entire free surface of the other side of said diaphragm.

2. The device of claim 1 wherein said fluid-loaded, sealed chamber includes at least two portions in fluid communication with each other through a restricted passage.

3. The device of claim 1 wherein said diaphragm is made of a rubber-like material.

4. The device of claim 3 wherein the diaphragm is imperforate and the surfaces over which said diaphragm flexes are faired to avoid shear on the diaphragm.

References Cited in the file of this patent

UNITED STATES PATENTS

| | | |
|---|---|---|
| 1,885,000 | Muller | Oct. 25, 1932 |
| 2,044,452 | Terry | June 16, 1936 |
| 2,229,418 | Mason | Jan. 21, 1941 |
| 2,398,811 | Stacey | Apr. 23, 1946 |
| 2,487,650 | Grove | Nov. 8, 1949 |
| 2,612,419 | Reynolds | Sept. 30, 1952 |

FOREIGN PATENTS

| | | |
|---|---|---|
| 56,114 | Norway | Jan. 27, 1936 |